(12) United States Patent
Porras et al.

(10) Patent No.: US 9,440,644 B2
(45) Date of Patent: Sep. 13, 2016

(54) SELECTIVE ELECTRIC MODE FOR ELECTRIC VEHICLE

(71) Applicant: FORD GLOBAL TECHNOLOGIES, LLC, Dearborn, MI (US)

(72) Inventors: Angel Fernando Porras, Dearborn, MI (US); Bryan Michael Bolger, Canton, MI (US); Christopher Adam Ochocinski, Canton, MI (US); Joseph Gerald Supina, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 14/281,963

(22) Filed: May 20, 2014

(65) Prior Publication Data

US 2015/0336568 A1  Nov. 26, 2015

(51) Int. Cl.

| | |
|---|---|
| *B60W 20/40* | (2016.01) |
| *B60W 20/00* | (2016.01) |
| *B60W 10/08* | (2006.01) |
| *B60W 10/06* | (2006.01) |
| *B60W 10/26* | (2006.01) |
| *B60W 50/08* | (2012.01) |
| *F02D 29/02* | (2006.01) |
| *B60W 30/182* | (2012.01) |

(52) U.S. Cl.
CPC .............. *B60W 20/40* (2013.01); *B60W 10/06* (2013.01); *B60W 10/08* (2013.01); *B60W 10/26* (2013.01); *B60W 20/00* (2013.01); *B60W 20/106* (2013.01); *B60W 20/13* (2016.01); *B60W 30/182* (2013.01); *B60W 50/082* (2013.01); *F02D 29/02* (2013.01); *B60W 2510/244* (2013.01); *B60W 2540/04* (2013.01); *B60W 2710/244* (2013.01); *Y10S 903/93* (2013.01)

(58) Field of Classification Search
CPC .. B60W 20/40; B60W 20/106; B60W 10/26; B60W 10/06; B60W 10/08; B60W 50/082; B60W 2510/244; B60W 2540/04; B60W 2710/244; Y10S 903/93; F02D 29/02
USPC .......................................................... 701/22
See application file for complete search history.

(56) References Cited

U.S. PATENT DOCUMENTS

| | | |
|---|---|---|
| 5,343,970 A | 9/1994 | Severinsky |
| 5,842,534 A | 12/1998 | Frank |
| 7,222,004 B2 | 5/2007 | Anderson |
| 7,898,405 B2 | 3/2011 | Burke et al. |
| 8,280,598 B2 | 10/2012 | Munukur et al. |
| 8,384,528 B2 | 2/2013 | McCarthy et al. |

(Continued)

FOREIGN PATENT DOCUMENTS

JP    2006315630    11/2006

*Primary Examiner* — Mcdieunel Marc
*Assistant Examiner* — James E Stroud
(74) *Attorney, Agent, or Firm* — Carlson, Gaskey & Olds, P.C.

(57) ABSTRACT

An example method includes operating an electric vehicle in an electric mode when a speed of the electric vehicle is at or below a threshold speed, and operating the electric vehicle in a hybrid mode when the speed of the electric vehicle is above the threshold speed. The threshold speed is an operator-adjustable threshold speed. Another example method includes operating an electric vehicle in an electric mode when a state of charge of a battery of the electric vehicle is at a threshold state of charge, and operating the electric vehicle in a hybrid mode when the state of charge of the battery is at or below the threshold state of charge.

18 Claims, 4 Drawing Sheets

(56) References Cited

U.S. PATENT DOCUMENTS

| | | | |
|---|---|---|---|
| 8,566,013 B2 | 10/2013 | Davis et al. | |
| 8,624,719 B2* | 1/2014 | Klose et al. | 340/455 |
| 8,682,525 B1* | 3/2014 | Kalinadhabhotla et al. | 701/36 |
| 2009/0044996 A1* | 2/2009 | Frank | 180/65.29 |
| 2010/0128089 A1* | 5/2010 | Sugahara | 347/47 |
| 2011/0166732 A1* | 7/2011 | Yu et al. | 701/22 |
| 2012/0265409 A1* | 10/2012 | Takeda | 701/48 |
| 2013/0245874 A1* | 9/2013 | Magnet et al. | 701/22 |
| 2013/0245912 A1* | 9/2013 | Boot | 701/93 |
| 2013/0274971 A1* | 10/2013 | Takahashi | 701/22 |
| 2014/0277882 A1* | 9/2014 | Isayeva | 701/22 |
| 2014/0278019 A1* | 9/2014 | Be et al. | 701/112 |

* cited by examiner

SELECTIVE ELECTRIC MODE FOR ELECTRIC VEHICLE

BACKGROUND

This disclosure relates to selectively operating an electric vehicle in an electric mode.

Example hybrid vehicles include hybrid electric vehicles (HEVs), and plug-in hybrid electric vehicles (PHEVs). Generally, hybrid vehicles differ from conventional motor vehicles because hybrid vehicles are selectively driven using a battery-powered electric machine. Conventional motor vehicles, by contrast, rely exclusively on an internal combustion engine to drive the vehicle.

A hybrid vehicle driven using the battery-powered electric machine generates less noise than when driven using the internal combustion engine. Noise from the internal combustion engine may be objectionable.

SUMMARY

A method according to an exemplary aspect of the present disclosure includes, among other things, operating an electric vehicle in an electric mode when a speed of the electric vehicle is at or below a threshold speed, and operating the electric vehicle in a hybrid mode when the speed of the electric vehicle is above the threshold speed. The threshold speed is an operator-adjustable threshold speed.

In another example of any of the foregoing methods, the operator-adjustable threshold speed can be adjusted by an operator when the electric vehicle is moving.

In another example of any of the foregoing methods, the operator-adjustable threshold speed is one of a plurality of fixed choices.

In another example of any of the foregoing methods, the method includes charging a battery of the electric vehicle to a charge level when operating the electric vehicle in a hybrid mode, the charge level calculated based on a desired reserve charge when the electric vehicle stops operating in the hybrid mode.

In another example of any of the foregoing methods, the desired reserve charge comprises an operator-adjustable desired reserve charge.

In another example of any of the foregoing methods, the operator-adjustable desired reserve charge can be adjusted by an operator when the electric vehicle is moving.

In another example of any of the foregoing methods, the operator-adjustable desired reserve charge comprises an electric distance amount.

In another example of any of the foregoing methods, the method includes alerting an operator of the vehicle of a transition from electric mode to a hybrid mode, and providing the operator with an option to a bypass the transition.

In another example of any of the foregoing methods, the method comprises initiating an audible count down timer.

A method according to another exemplary aspect of the present disclosure includes, among other things, operating an electric vehicle in an electric mode when a state of charge of a battery of the electric vehicle is above a threshold state of charge, and operating the electric vehicle in a hybrid mode when the state of charge of the battery is at or below the threshold state of charge. The threshold state of charge is an operator-adjustable threshold state of charge.

In another example of any of the foregoing methods, the method includes charging the battery of the electric vehicle to the threshold state of charge when operating the electric vehicle in a hybrid mode, the threshold state of charge calculated based on a desired reserve charge when the electric vehicle stops operating in the hybrid mode.

In another example of any of the foregoing methods, the desired reserve charge is an operator-adjustable desired reserve charge.

In another example of any of the foregoing methods, the operator-adjustable desired reserve charge can be adjusted by an operator when the electric vehicle is moving.

An apparatus according to an exemplary aspect of the present disclosure includes, among other things, a powertrain controller configured to cause an electric vehicle to operate in an electric mode when a speed of the electric vehicle is at or below a threshold speed, and to operate in a hybrid mode when the speed of the electric vehicle is above the threshold speed.

An apparatus according to another exemplary aspect of the present disclosure includes, among other things, a threshold speed selector device that is actuated to adjust the threshold speed.

In another example of the foregoing apparatus, the powertrain controller is further configured to cause a battery of the electric vehicle to be charged to a charge level when operating the electric vehicle in a hybrid mode. The charge level is calculated based on a desired reserve charge within the battery when the electric vehicle stops operating in the hybrid mode.

In another example of any of the foregoing apparatus, a charge level selector device is actuated to adjust the desired reserve charge.

In another example of any of the foregoing apparatus, the desired reserve charge comprises a range of desired reserve charges.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
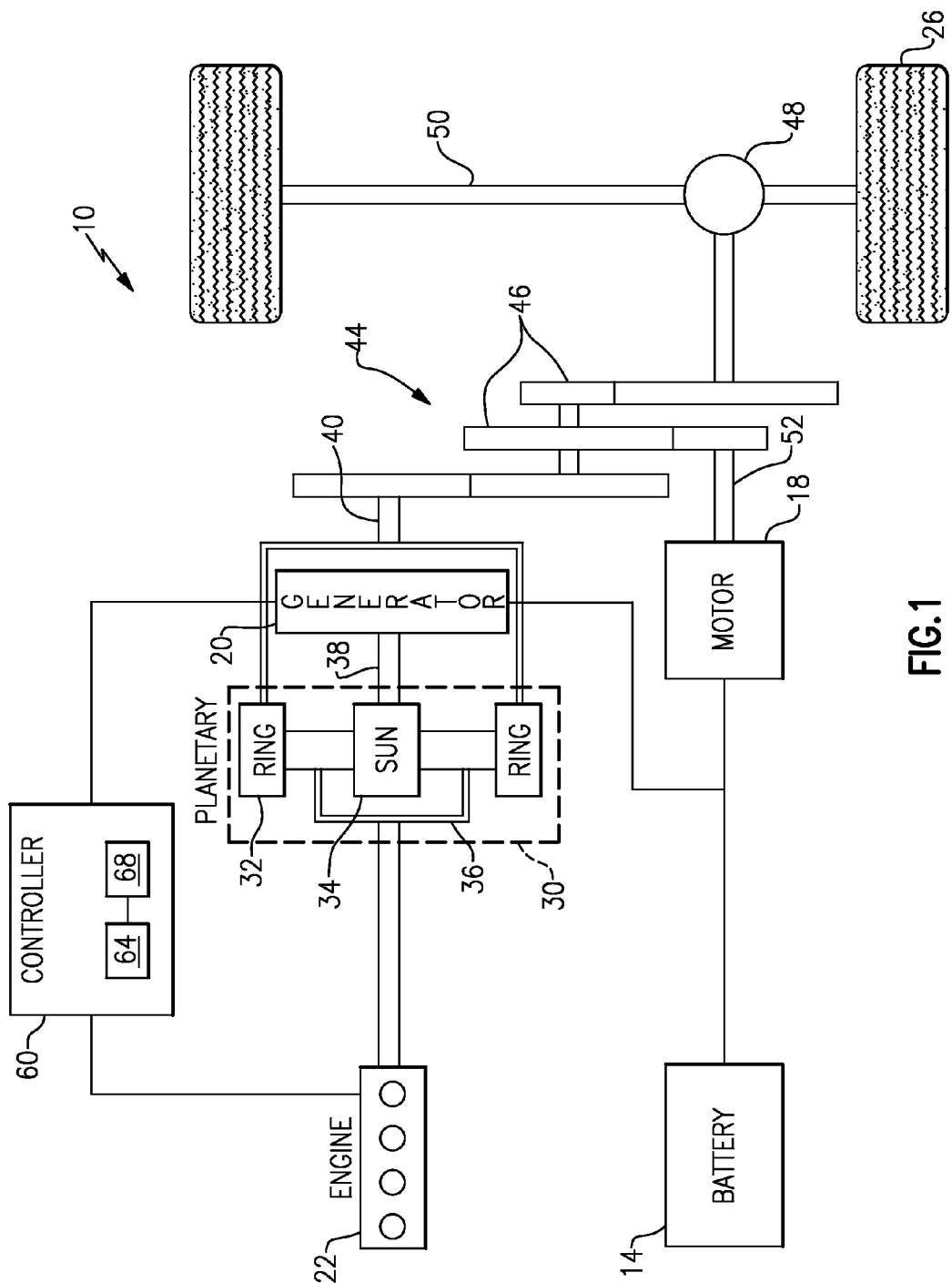
FIG. 1 illustrates a schematic view of an example transmission for an electric vehicle.

FIG. 1 schematically illustrates a powertrain 10 for an electric vehicle. The powertrain 10 includes a battery 14, an electric machine (motor) 18, an electric machine (generator) 20, and an internal combustion engine 22. The battery 14 is a relatively high-voltage battery in this example.

Although depicted as a hybrid electric vehicle (HEV), it should be understood that the concepts described herein are not limited to HEVs and could extend to other electrified vehicles, including, but not limited to, plug-in hybrid electric vehicles (PHEVs), etc.

In one embodiment, the powertrain 10 is a power-split powertrain system that employs a first drive system and a second drive system. The first drive system includes a combination of the engine 22 and the generator 20. The second drive system includes at least the motor 18, the generator 20, and a battery 14. In this example, the second drive system is considered an electric drive system of the powertrain 10. The first and second drive systems generate torque to drive one or more sets of vehicle drive wheels 26 of the electric vehicle.

The engine 22, which is an internal combustion engine in this example, and the generator 20 may be connected through a power transfer unit 30, such as a planetary gear set. Of course, other types of power transfer units, including other gear sets and transmissions, may be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 14 through the power transfer unit 30 to convert kinetic energy to electrical energy. The generator 18 can alternatively function as a motor to convert electrical energy into kinetic energy, thereby outputting torque to a shaft 60 connected to the power transfer unit 30. Because the generator 18 is operatively connected to the engine 14, the speed of the engine 14 can be controlled by the generator 18.

The ring gear 32 of the power transfer unit 30 may be connected to a shaft 64, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 28.

The motor 18 (i.e., the second electric machine) can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery 14.

The battery 14 is an example type of electric vehicle battery assembly. The battery 14 may incorporate a high voltage battery that is capable of outputting electrical power to operate the motor 18 and the generator 20. Other types of energy storage devices and/or output devices can also be used with the electric vehicle having the powertrain 10.

The powertrain 10 generates more noise when operating in the hybrid mode with the engine 22 than when operating in the electric mode without the engine 22. This is due, at least in part, to the noise from the internal combustion engine 22 operating when the powertrain operates in the hybrid mode. The operating internal combustion engine 22 is noisier than the operating generator 20 or motor 18 alone.

A powertrain controller 60 is operatively coupled to portions of the powertrain 10, such as the internal combustion engine 22 and the electric machine 20. The controller 60 causes the powertrain 10 to drive a vehicle in the electric mode or the hybrid mode. The controller 60 may instruct the powertrain 10 to shut down the internal combustion engine 22 and to drive the vehicle in the electric mode to reduce noise from the powertrain 10. The motor 18, the generator 20, the internal combustion engine 22, and other portions of the powertrain 10 respond to commands from the controller 60.

The controller 60 may be part of an engine control module, a battery electric control, etc. within the vehicle. The example controller 60 includes a processor 64 operatively linked to a memory portion 68. The example processor 64 is programmed to execute a program stored in the memory portion 68. The program may be stored in the memory portion 68 as software code.

The program stored in the memory portion 68 may include one or more additional or separate programs, each of which includes an ordered listing of executable instructions for implementing logical functions.

The processor 64 can be a custom made or commercially available processor, a central processing unit (CPU), an auxiliary processor among several processors associated with the controller 60, a semiconductor based microprocessor (in the form of a microchip or chip set) or generally any device for executing software instructions.

The memory portion 68 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

Figure 2:
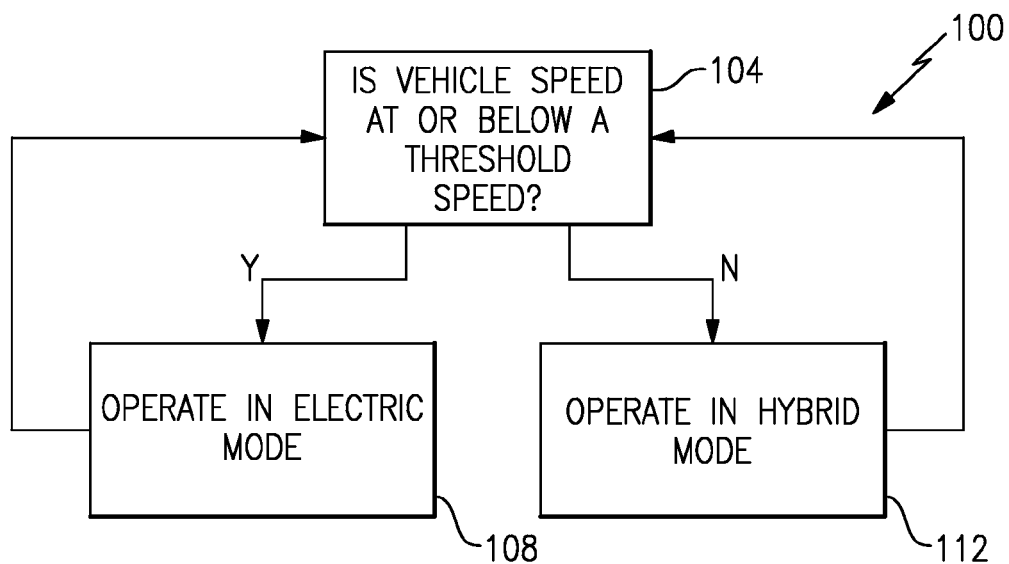
FIG. 2 shows an example method of operating an electric vehicle having the transmission of FIG. 1.

Referring now to FIG. 2 with continued reference to FIG. 1, an example method 100 of operating an electric vehicle having the powertrain 10 enables an operator of the vehicle to control use of the internal combustion engine 22 based on speed. The method 100 enables the operator to operate the vehicle in a quiet mode when the vehicle is operating at certain speeds. The method 100 is an example program executed by the processor 64.

The operator could be a driver of the vehicle, a passenger of the vehicle, a manufacturer of the vehicle, or another individual desiring to adjust how the powertrain 10 switches between the hybrid mode and the electric mode of operation.

The method 100 includes a step 104 of calculating whether or not the vehicle having the powertrain 10 is operating at or below a threshold speed. The calculation may account for hysteresis. If yes, the method moves to the step 108, which is considered an EV Now mode. In the EV Now mode, the vehicle operates in an electric mode. If the vehicle speed is above the threshold speed, the method 100 moves to a step 112, which is considered an EV Later mode. In the EV Later mode, the vehicle operates in a hybrid mode.

Some electric vehicle powertrains control switching between the hybrid mode and electric mode based on power requirements. The method 100 controls switching between the hybrid mode and the electric mode based on vehicle speed.

In some examples, the threshold speed is adjustable, by the operator, for example. Adjustments to the threshold speed may occur when the vehicle is moving. The threshold speed selection could be made through an instrument cluster menu, Accessory Protocol Interface Module, etc.

In some example embodiments, the operator selects the threshold speed from one of a plurality of fixed speed choices, for example, 35, 45, or 55 miles per hour.

In some example embodiments, the operator actuates a knob, dial, button on a display, virtual representations of these, or some other selector device to vary the selection from among several choices within a range of speeds. Any speed between 35 and 55 miles per hour for example.

The operator may select the threshold speed to be above the speeds typical of the vehicle when moving through certain geographical areas, such as city centers. After selecting this threshold speed, the vehicle operates in electric mode when the vehicle moves through these geographical areas at speeds below the threshold speed.

The vehicle operates in electric mode in these areas because the speed of the vehicle is not greater than the threshold speed. Individuals within the geographical area, such as pedestrians within the city center, thus do not hear the vehicle operate in the hybrid mode. Further, because the internal combustion engine 22 is not operating, exhaust gases from the internal combustion engine are not dumping directly into the city center.

When the vehicle reaches speeds exceeding the threshold speed, the vehicle will have likely moved out of the geographical area. The internal combustion engine 22 can then operate without being heard by individuals within the geographical area.

If the vehicle continues to operate in electric mode for an extended period of time, the vehicle may eventually have to begin operating again in a hybrid mode to charge the battery 14.

To extend the length of time that the vehicle can operate in electric mode, some embodiments of the method may include charging the battery 14 of the vehicle to a desired charge level when operating the vehicle in a hybrid mode.

The desired charge level may be calculated based on a desired charge available for when the speed of the vehicle drops below the threshold speed and the vehicle begins to operate in electric mode. The operator may desire, for example, for the battery 14 to have a state of charge permitting ten miles of driving in the electric mode after the hybrid mode is complete and the vehicle speed drops below the threshold speed.

The operator thus inputs ten miles through a type of selector device, such as a human-machine interface screen. A state of charge of the battery 14 is then maintained at a level capable of providing ten miles of operation in the electric mode.

The desired reserve charge may be based on mileage as described above. The desired reserve charge could alternatively be a chosen from among a few fixed charge levels, such as twenty-five, fifty, or seventy-five percent state of charge. The desired reserve charge could also be a charge range such as from seventy to eighty percent.

For the state of charge selection, the choice could be made via a virtual knob, a slide bar in the outline of a battery, etc.

The operator may select twenty miles of travel based on an estimate that the operator will drive the vehicle twenty miles below the threshold speed without exceeding the threshold speed. The operator could make this selection prior to entering a city center or another type of low-speed geographical area.

Notably, selecting the desired reserve charge may cause the battery 14 to charge to a customer-selected charge that is higher than a typical state of charge or distance to empty.

Figure 3:
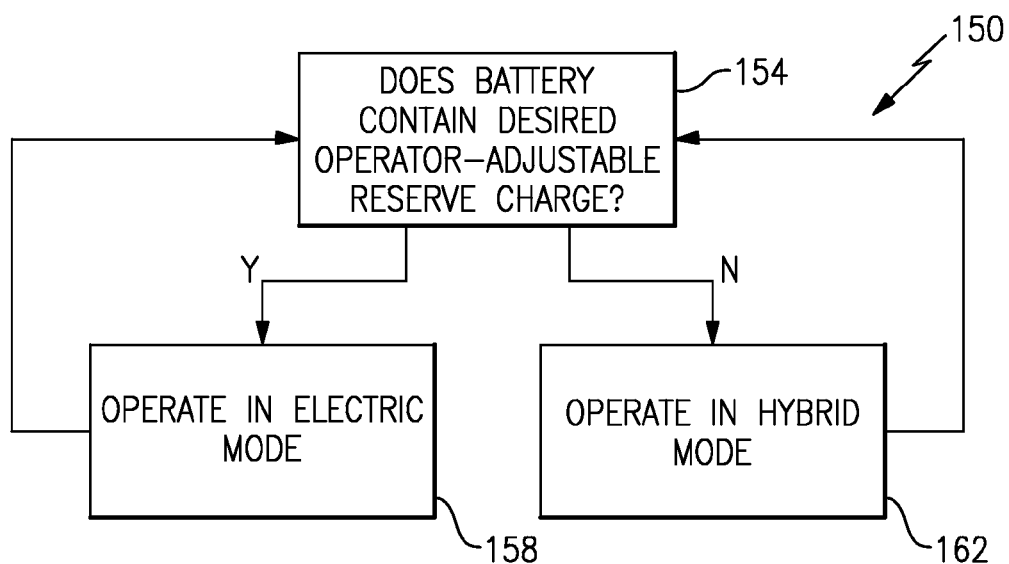
FIG. 3 shows another example method of operating an electric vehicle having the transmission of FIG. 1.

Referring now to FIG. 3 with continued reference to FIG. 1, another example method 150 of operating an electric vehicle having the powertrain 10 enables an operator of the vehicle to control use of the internal combustion engine 22 based on a state of charge of the battery 14. The method 150 can be executed on the processor 64 of the powertrain controller 60.

The method 150 determines a state of charge and may account for hysteresis. The method 150 includes a step 154 of calculating whether the battery 14 contains the desired reserve charge, which is operator-adjustable. At a step 158, the method 150 causes the powertrain 10 to operate in an electric mode when a state of charge of the battery of the electric vehicle is above the desired reserve charge. The method 150 includes a step 162 of operating in a hybrid mode when the state of charge of the battery is at or below the desired reserve charge.

Some electric vehicle powertrains control switching between the hybrid mode and electric mode based on power requirements. The method 100 controls switching between the hybrid mode and the electric mode based on an amount of reserve charge in the battery 14.

Although the state of reserve charge (in kW-hrs) is directly adjusted in this example. Other examples may include indirect adjustments to the state of charge, such as by setting power level for the battery 14, a state of charge level (in percent) for the battery, or an electric distance amount (20 miles of travel using battery power, for example.)

Figure 4:
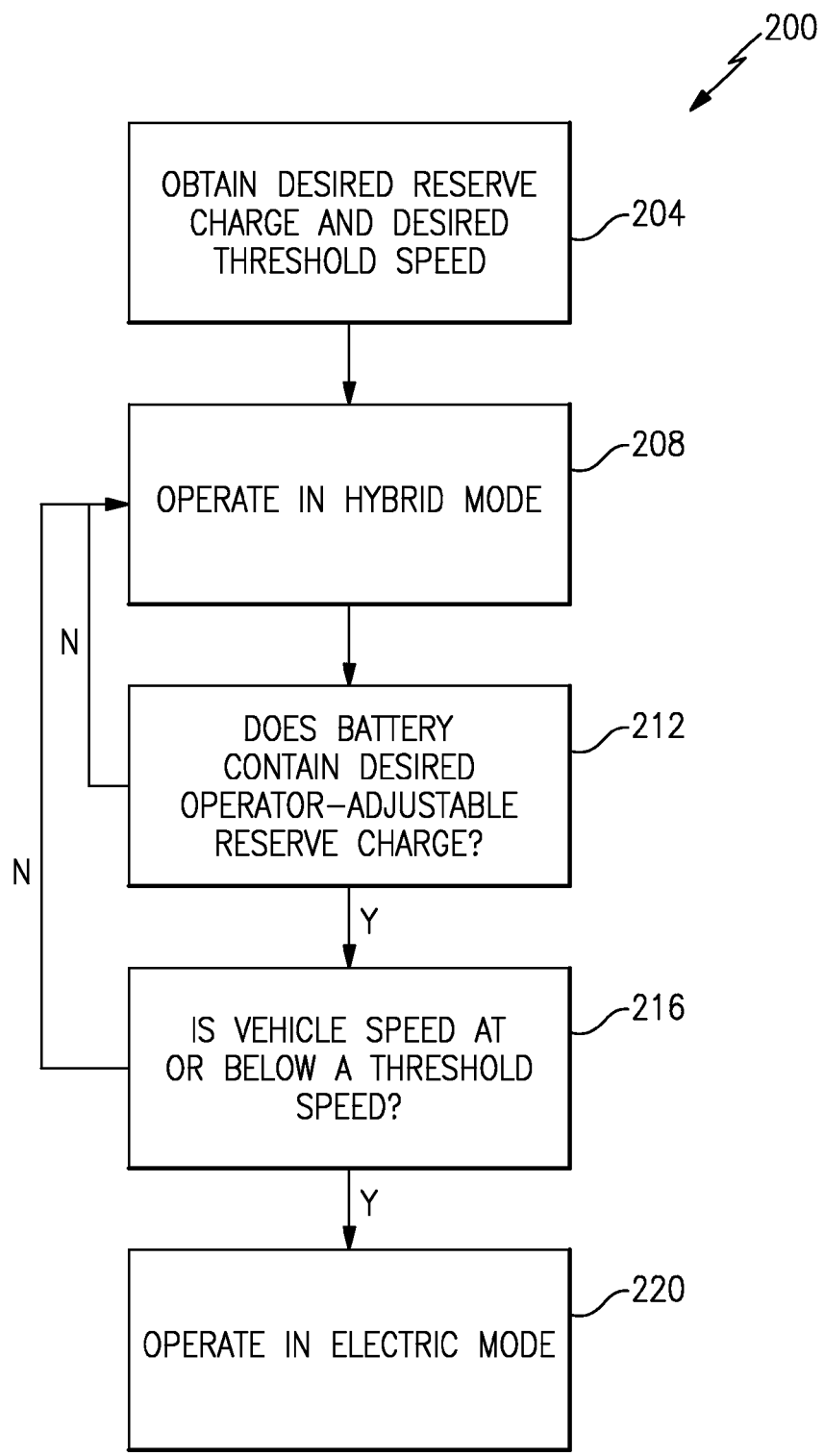
FIG. 4 shows yet another example method of operating an electric vehicle having the transmission of FIG. 1.

Referring now to FIG. 4 with reference to FIG. 1, in another example method 200, both a threshold speed and a desired reserve charge are used to control how the powertrain 10 switches between the first drive system and the second drive system. At a step 204, the method 200 obtains a desired threshold speed and reserve charge. The operator of the vehicle can provide these variables, for example. The threshold speed may be a range of speeds such as from forty to sixty miles per hour. The desired reserve charge can be a range of desired reserve charges for the battery 14, such as seventy to eighty percent state of charge.

Next, at a step 208, the method 200 operates in the hybrid mode. While operating in the hybrid mode, the method 200 determines if the battery 14 contains the desired reserve charge at a step 212. If yes, the method 200 then determines if a speed of the vehicle is at or below the threshold speed at a step 216. If yes, the method 200 operates the vehicle in electric mode at a step 220 until vehicle exceeds threshold speed or is required to return to a hybrid mode for recharging.

In the methods of FIGS. 2, 3, and 4, an alert may be generated to indicate an upcoming switch between electric and hybrid modes.

The methods may generate other alerts at other times to inform operators of the vehicle. The alerts could be visual alerts, audible alerts, tactile alerts, or some combination of these.

In one example, the alert is a count-down timer informing of an impending engine pull-up, for example. The alert may start three seconds before an engine pull-up. The engine pull-up could be due to a switch from electric to hybrid mode. The engine pull-up could be due to a required start of the engine when in a hybrid mode.

The alerts could permit the operator to change their mind regarding a switch between a hybrid and electric mode and, for example, allow the operator to maintain operation in the hybrid mode.

Figure 5:
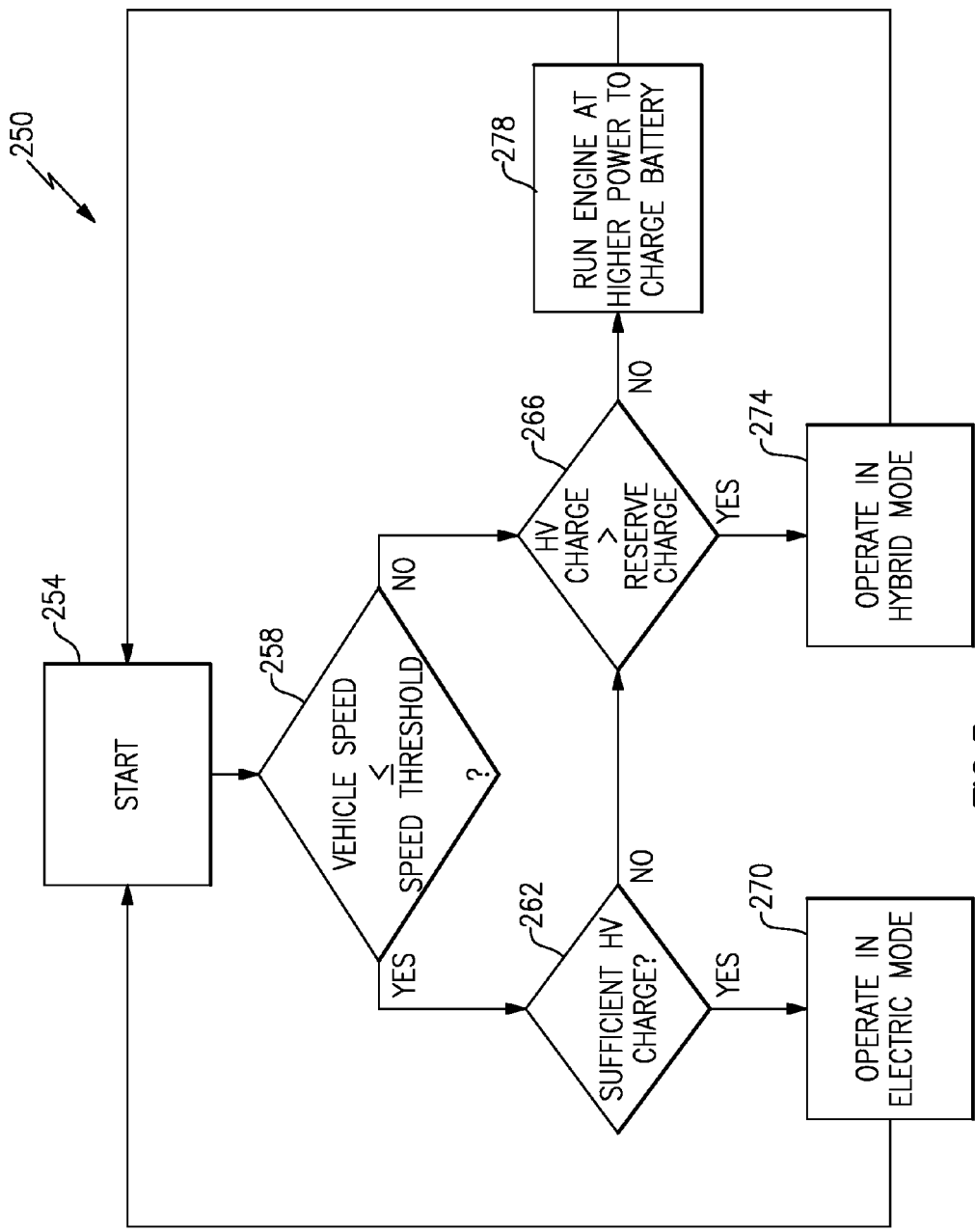
FIG. 5 shows still another example method of operating an electric vehicle having the transmission of FIG. 1.

Referring now to FIG. 5, another method 250 of operating a vehicle having the powertrain 10 of FIG. 1 starts at a step 254. The method 250 then calculates, at a step 258, if the vehicle speed is at or below a speed threshold. If yes, the method moves to a step 262. If no, the method moves to a step 266.

At the step 262, the method 250 calculates whether there is sufficient charge in the battery 14. If yes, the method 250 moves to the step 270 where the vehicle operates in electric mode and then returns to start 254. If no, the method 250 moves to the step 266.

At the step 266, the method 250 calculates whether the charge in the battery 14 exceeds a threshold reserve charge level. If yes, the method 250 moves to the step 274 wherein the vehicle operates in hybrid mode and then returns to the start 254. If no, the method 250 runs the engine 22 at a higher power to charge the battery 14 at a step 278 and then returns to the start 254.

Any of the methods of FIGS. 2 to 5 may account for hysteresis when determining, for example, the vehicle speed, the reserve charges, etc.

Features of some the disclosed examples include a method of operating a powertrain for a hybrid electric vehicle that permits an operator to selectively operate the vehicle in an electric mode at a start of a trip, at low speeds or stops along the trip, or at the end of the trip. Electric operation can be prioritized over energy efficiency.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method, comprising: operating, by a controller, an electric vehicle in an electric mode when a speed of the electric vehicle is at or below a threshold speed; operating, by the controller, the electric vehicle in a hybrid mode when the speed of the electric vehicle is above the threshold speed; using a selector device to adjust the threshold speed, the adjustment of the threshold speed independent from an adjustment to an actual speed of the electric vehicle, and charging a battery of the electric vehicle to a charge level when operating the electric vehicle in a hybrid mode, the charge level calculated based on a desired reserve charge when the electric vehicle stops operating in the hybrid mode.

2. The method of claim 1, further comprising using the selector device to adjust the threshold speed when the electric vehicle is moving.

3. The method of claim 1, wherein the threshold speed is one of a plurality of fixed choices.

4. The method of claim 1, wherein the desired reserve charge comprises an operator-adjustable desired reserve charge.

5. The method of claim 4, wherein the operator-adjustable desired reserve charge can be adjusted by an operator using the selector device or another selector device when the electric vehicle is moving.

6. The method of claim 4, wherein the operator-adjustable desired reserve charge comprises an operator-adjustable electric distance amount.

7. The method of claim 1, further comprising alerting an operator of the vehicle of a transition between the electric mode and the hybrid mode, and providing the operator with an option to bypass the transition.

8. The method of claim 7, wherein the alerting comprises initiating an audible count down timer.

9. A method, comprising: automatically operating, using a controller, an electric vehicle in an electric mode when a state of charge of a battery of the electric vehicle is above a threshold state of charge that is calculated based on a desired reserve charge when the electric vehicle stops operating in a hybrid mode; automatically operating, using the controller, the electric vehicle in the hybrid mode when the state of charge of the battery is at or below the threshold state of charge; and using an operator-adjustable selector device to adjust the threshold state of charge.

10. The method of claim 9, further comprising charging the battery of the electric vehicle to the threshold state of charge when operating the electric vehicle in a hybrid mode.

11. The method of claim 9, wherein the desired reserve charge is an operator-adjustable desired reserve charge.

12. The method of claim 11, wherein the operator-adjustable desired reserve charge can be adjusted by an operator using the operator-adjustable selector device or another operator-adjustable selector device when the electric vehicle is moving.

13. An apparatus, comprising: a powertrain controller configured to cause an electric vehicle to operate in an electric mode when a speed of the electric vehicle is at or below a threshold speed, and to operate in a hybrid mode when the speed of the electric vehicle is above the threshold speed, the powertrain controller further configured to cause a battery of the electric vehicle to be charged to a charge level when operating the electric vehicle in the hybrid mode, the charge level calculated based on a desired reserve charge within the battery when the electric vehicle stops operating in the hybrid mode; and a threshold speed selector device that is actuated to adjust the threshold speed independently from the speed of the electric vehicle.

14. The apparatus of claim 13, further comprising an operator-adjustable charge level selector device that is actuated to adjust the desired reserve charge.

15. The apparatus of claim 13, wherein the desired reserve charge comprises a range of desired reserve charges that can be each be individually selected by an operator using an operator-adjustable charge level selector device when the electric vehicle is moving.

16. The method of claim 1, wherein the selector device comprises a human machine interface.

17. The method of claim 9, wherein the operatable-adjustable selector device comprises a human machine interface.

18. The method of claim 13, wherein the powertrain controller is further configured to provide an alert to an operator of the vehicle, the alert alerting the operator of a transition from electric mode to a hybrid mode, and providing the operator with an option to bypass the transition.

* * * * *